US012432118B2

(12) United States Patent
Mercier et al.

(10) Patent No.: US 12,432,118 B2
(45) Date of Patent: Sep. 30, 2025

(54) AUTO-FORMATION OF LINK AGGREGATIONS BASED ON REMOTELY-ISSUED INSTRUCTIONS

(71) Applicant: Hewlett Packard Enterprise Development LP, Houston, TX (US)

(72) Inventors: Mathieu Mercier, Laval (CA); Robert Gagnon, Terrebonne (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 704 days.

(21) Appl. No.: 17/711,696

(22) Filed: Apr. 1, 2022

(65) Prior Publication Data

US 2023/0318910 A1    Oct. 5, 2023

(51) Int. Cl.
*H04L 41/0803* (2022.01)
*H04L 12/46* (2006.01)
*H04L 41/12* (2022.01)

(52) U.S. Cl.
CPC .......... *H04L 41/12* (2013.01); *H04L 12/4641* (2013.01); *H04L 41/0803* (2013.01)

(58) Field of Classification Search
CPC ... H04L 47/41; H04L 43/0894; H04L 45/245; Y02D 30/50
See application file for complete search history.

(56) References Cited

U.S. PATENT DOCUMENTS

| 2014/0133486 | A1* | 5/2014  | Sivasankar | H04L 47/41 370/392 |
| 2017/0063672 | A1* | 3/2017  | Chhabra    | H04L 41/0663 |
| 2017/0310548 | A1* | 10/2017 | Jailani     | H04L 41/0806 |
| 2018/0367408 | A1* | 12/2018 | Li          | H04L 45/745 |
| 2019/0075043 | A1* | 3/2019  | Selvaraj    | H04L 47/828 |
| 2020/0252331 | A1* | 8/2020  | Singal      | H04L 49/25 |
| 2022/0038382 | A1* | 2/2022  | Sankaran    | H04L 43/0894 |

* cited by examiner

*Primary Examiner* — Ayaz R Sheikh
*Assistant Examiner* — Mang Boi Thawng
(74) *Attorney, Agent, or Firm* — Park, Vaughan, Fleming & Dowler LLP

(57) ABSTRACT

A system for facilitating auto-formation of link aggregations is provided. During operation, the system can obtain information associated with connectivity between a first device and a second device. The system can remotely provide network configurations to the first and second devices via a network. If the connectivity includes a plurality of links, the system can identify a subset of links of the plurality of links that can be configured as a Link Aggregation Group (LAG) based on a set of grouping criteria for selecting a respective link for the LAG. The system can then generate respective configuration commands executable at the first and second devices for generating the LAG based on the information associated with connectivity. Subsequently, the system can send the respective configuration commands to the first and second devices. The configuration commands can facilitate the formation of the LAG at the first and second devices.

17 Claims, 12 Drawing Sheets

AUTO-FORMATION OF LINK AGGREGATIONS BASED ON REMOTELY-ISSUED INSTRUCTIONS

BACKGROUND

Field

The present disclosure relates to communication networks. More specifically, the present disclosure relates to a method and system for automatically forming link aggregation groups (LAGs) based on deployment using remotely-issued instructions.

BRIEF DESCRIPTION OF THE FIGURES

In the figures, like reference numerals refer to the same figure elements.

DETAILED DESCRIPTION

Figure 1A:
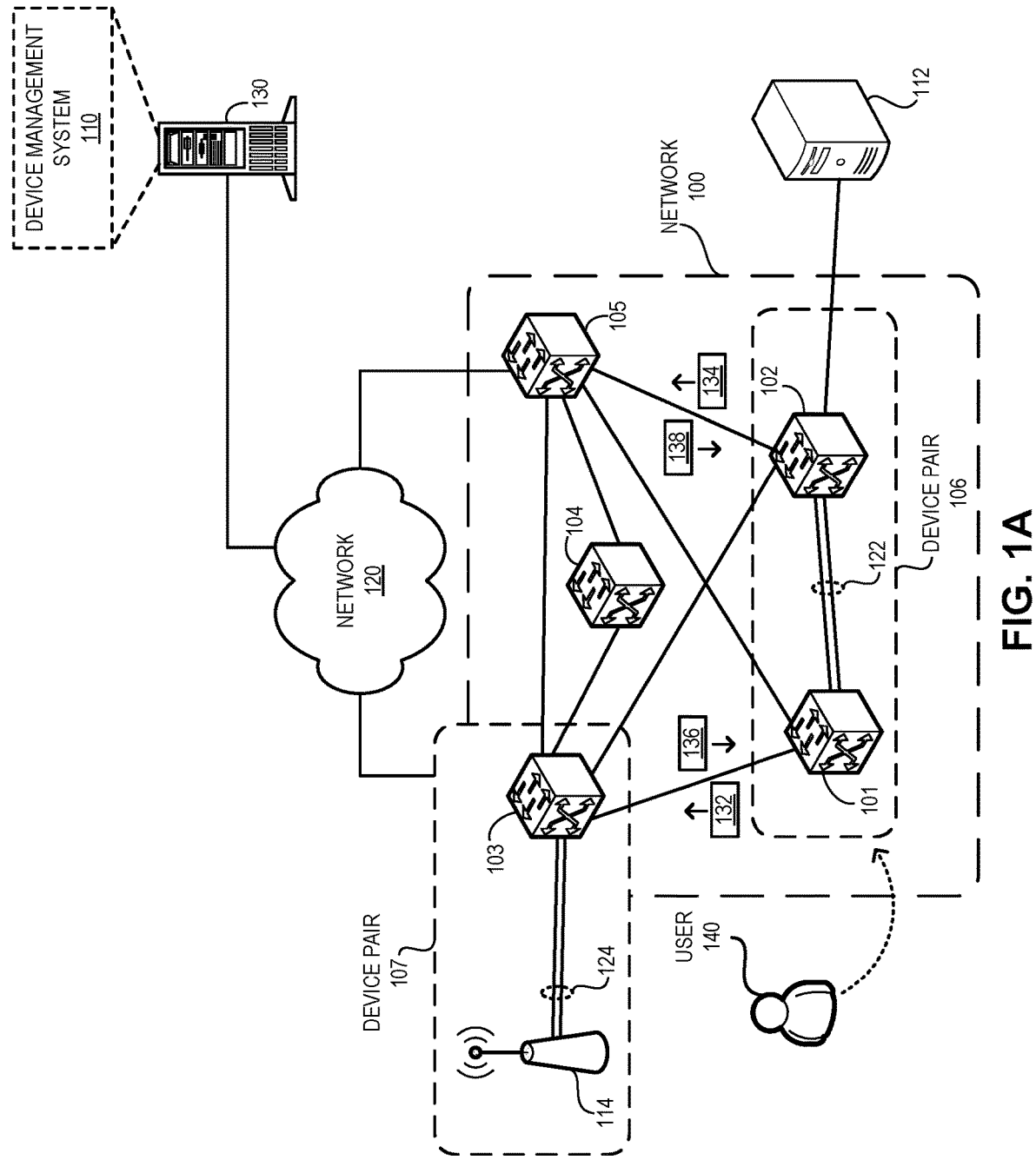
FIG. 1A illustrates an example of a network managed by a device management system (DMS) facilitating auto-formation of LAGs based on deployment using remotely-issued instructions, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

The Internet can be the delivery medium for a variety of applications running on physical and virtual devices. Such applications have brought with them an increasing demand for bandwidth. As a result, equipment vendors race to build larger switches with significant transmission capabilities. To further bolster the transmission capacity between two devices, multiple links between the devices can be aggregated together to form a link aggregation group (LAG). A user (e.g., a network administrator) may configure two or more ports on each of the devices to be combined together for the LAG. The combined ports can be represented as a virtual interface that has the sum of the individual ports' bandwidth.

One aspect of the present technology can provide a system for facilitating the auto-formation of link aggregations. During operation, the system can obtain information associated with connectivity between a first device and a second device. The system can remotely provide network configurations to the first and second devices via a network. If the connectivity includes a plurality of links, the system can identify a subset of links of the plurality of links that can be configured as a Link Aggregation Group (LAG) between the first and second devices based on a set of grouping criteria for selecting a respective link for the LAG. The LAG can operate as an aggregated link with redundancy. The system can then generate respective configuration commands executable at the first and second devices for generating the LAG based on the information associated with connectivity. Subsequently, the system can send the respective configuration commands to the first and second devices. The configuration commands can facilitate the formation of the LAG at the first and second devices.

In a variation on this aspect, the system can obtain the information associated with the connectivity between the first and second devices by receiving respective notification messages comprising local link configuration information from the first and second devices.

In a further variation, the local link configuration information can include telemetry data discovered using Link Layer Discovery Protocol (LLDP) at the first and second devices.

In a variation on this aspect, the set of grouping criteria can indicate one or more of: ports participating in the LAG belong to the first and second devices, a threshold number of ports are present in the LAG, the same set of virtual local area networks (VLANs) are configured at a respective port of the LAG, and a respective port of the LAG belong to the same port type.

In a variation on this aspect, the system can determine whether to reconfigure one or more ports forming the subset of links based on a set of strategies, wherein the reconfiguration can facilitate configuration consistency among ports of the subset of links.

In a further variation, the set of strategies indicates whether to generate one or more of: no LAG, all possible LAGs, a LAG that groups all possible redundant connections, and a LAG with the highest possible transmission capacity.

In a variation on this aspect, the system can identify a second subset of links of the plurality of links that can be configured as a second LAG between the first and second devices based on the set of grouping criteria.

In a variation on this aspect, the system can obtain updated information indicating a modification to one or more ports or links of the LAG and determining whether the LAG can be maintained.

In a further variation, if the LAG can be maintained, the system can generate respective configuration commands executable at the first and second devices for updating the LAG in accordance with updated information. On the other hand, if the LAG cannot be maintained, the system can generate respective configuration commands executable at the first and second devices for removing the LAG.

The examples described herein solve the problem of forming a LAG between two devices without manual configuration on the devices by (i) automatically determining one or more LAGs that can be formed between remote devices based on discovered deployment information; and (ii) providing instructions executable by the remote devices for forming the LAGs. The devices may send the local deployment information, such as link information, to a device management system. In response, the system can determine the links that can form LAG and send respective instructions to the devices that allow the devices to form the LAG without requiring a user configuring (e.g., manually or based on a script) the LAG at the devices.

With existing technologies, some devices, such as network switches, end devices (e.g., user or client devices), and access points, can be managed using a local interface, such as a command-line interface (CLI) or a web interface, or through a cloud-based device management system. Regardless of the management platform, enabling or disabling some features on the devices may require device-specific instructions from a user. In other words, the user may need to issue the corresponding commands or select the associated features from the management platform. For example, to increase the bandwidth between two devices, the user may couple two devices with multiple redundant links. These redundant links can be combined to form a LAG and operate as a single virtual link.

However, the LAG creation can be an advanced feature for most devices. Such an advanced feature may require the configuration and selection of the correct ports on the devices participating in the LAG. For example, the user may issue commands to combine a threshold number of ports (e.g., two or more ports), such as Ethernet ports, together for forming the LAG with the redundant links. The combination can generate a virtual interface on the device that has the sum of the individual ports' bandwidth. Furthermore, the user may need to be aware of technical details associated with the ports, such as the inter-operability of the ports in the LAG (e.g., same operating speed and configured with the same VLANs). As a result, even if the devices can discover the redundant links using a link discovery protocol, the devices may not automatically form the LAG without being configured by the user.

To solve this problem, a respective device in a network may discover how the local links are deployed (e.g., local link configuration) associated with the local ports and send the deployment information to a device management system (DMS), which can operate on a network-accessible device (e.g., a server). The DMS may operate within the same network of the devices, or can be accessible via another network, such as an enterprise network or a wide-area network (WAN) (e.g., the Internet). Hence, the DMS can be accessible from a local instance or a distributed instance of the cloud. The device may obtain the deployment information of the local links based on a link discovery protocol, such as Link Layer Discovery Protocol (LLDP).

The device may include the deployment information (or telemetry data) in a discovery message and send the discovery message to the DMS. In this way, the device can report the local link deployment information to the DMS. Upon receiving a discovery message from a respective device of the network, the DMS may detect the redundant connections (e.g., connections with more than one cable) between a respective device pair. In other words, the DMS may detect when a plurality of ports of one device of the pair is coupled to a corresponding plurality of ports of the other device of the pair.

The DMS can then check the redundant connections against a set of formation (or grouping) criteria. The set of criteria can include consistency of virtual local area network (VLAN) configuration and compatible port types (e.g., transmission capacities). Subsequently, the DMS can determine a LAG that can be formed with a respective subset of the redundant connections. Accordingly, the ports of the subset of redundant connections can have the same type and can be configured with the same VLANs. The DMS can generate configuration command(s) for a respective device of the pair that can configure the LAG between the device pair from the receiving device. The DMS can then include the command(s) in a control message and send the control message to the device. Upon receiving the control message, the device may execute the command(s), thereby forming the LAG at the device without intervention from the user.

Here, the DMS may form the LAGs based on the criteria that can enforce consistency of configuration among the ports of a LAG. As a result, the DMS may determine a plurality of LAGs between the same device pair. In addition to or instead of the enforcement of consistency, the criteria can also include reconfiguration of ports. For example, if the reconfiguration is set for VLANs, the DMS may first reconfigure one or more ports to ensure that the same set of VLANs is configured at a respective port facilitating the redundant connections. The DMSs can then form a LAG with the redundant connections provided by the ports that have the same VLAN configuration and same port type. In this way, reconfiguration may allow the DMS to configure a LAG with more links.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z or Compute Express Link (CXL) network, a processor device, or a fabric switch comprising a plurality of similar or heterogeneous smaller physical and/or virtual switches.

A phrase indicating a device, such as "node," "machine," "entity," or "device" may indicate a switch and an end host, such as a user device. The term "message" refers to a group of bits that can be transported together across a network. "Message" should not be interpreted as limiting examples of the present examples to a particular layer of a network. "Message" can be replaced by other terminologies referring to a group of bits, such as "information," "data," "request," "response," "packet," "frame," "cell," "datagram," or "transaction." Furthermore, the term "port" can refer to the port that can receive, store, or transmit data. "Port" can also refer to the hardware, software, and/or firmware logic that can facilitate the operations of that port.

FIG. 1A illustrates an example of a network managed by a device management system (DMS) facilitating auto-formation of LAGs based on deployment using remotely-issued instructions, in accordance with an aspect of the present application. A network 100 can include a plurality of devices, such as switches and end devices. Network 100 can include switches 101, 102, 103, 104, and 105. Network 100 can be coupled to devices 112 and 114 via switches 102 and 103, respectively. Examples of such a device can include, but are not limited to, a desktop or laptop computer, a server-grade computer, an appliance, a service-facilitating device (e.g., a cell tower or an access point), a virtual machine (VM), an application, a container, a cellular device, a tablet, a wearable device, a stationary or portable gaming console, a projection device, a network device (e.g., a switch), an attachable dongle, an augmented or virtual reality device, and a vehicular device. In some examples, network 100 can be an Ethernet, InfiniBand, PCIe, Gen-Z, CXL, or other networks, and may use a corresponding communication protocol, such as Internet Protocol (IP), FibreChannel over Ethernet (FCoE), or other protocol.

With existing technologies, the switches of network 100 and other devices, such as device 114, can be managed using a local interface, such as a CLI or a web interface, or through a DMS. Regardless of the management platform, enabling or disabling some features on a switch, such as switch 103, and device 114, may require device-specific instructions from a user 140. In other words, user 140 may need to issue the corresponding commands or select the associated features from the management platform to enable the feature on switch 103 and device 114. For example, to increase the bandwidth between switch 103 and device 114, user 140 may couple switch 103 and device 114 with multiple redundant links. These redundant links can be combined to form a LAG 124 and operate as a single virtual link.

However, the creation of LAG 124 can be an advanced feature for switch 103 and device 114. Such an advanced feature may require the configuration and selection of the correct ports on switch 103 and device 114. For example, user 140 may issue commands to combine a threshold number of ports (e.g., two or more ports), such as Ethernet ports, of switch 103 together for forming LAG 124 with the redundant links. The combination can generate a virtual interface on switch 103 that has the sum of the individual ports' bandwidth. Furthermore, user 140 may need to be aware of technical details associated with the ports, such as the inter-operability of the ports in LAG 124 (e.g., same operating speed and configured with the same VLANs). As a result, even if switch 103 can discover the redundant links using a link discovery protocol, switch 103 may not automatically form LAG 124 without being configured by user 140.

To solve this problem, a respective device managed by DMS 110 (e.g., switches in network 100 and device 114) may discover how the local links are deployed. The device, such as switch 101, may obtain the deployment information of the local links based on a link discovery protocol, such as LLDP. Such discovery can include the local link configuration associated with the local ports and send the deployment information to a DMS 110, which can operate on a network-accessible device, such as a server 130. DMS 110 may operate in network 100, or can be accessible via another network 120 coupled to switches 103 and 105. Network 120 can include an enterprise network or a WAN (e.g., the Internet). Hence, DMS 110 can be accessible from a local instance or a distributed instance of the cloud.

Switch 101 may include the deployment information (or telemetry data) associated with the local ports and the links coupling the local ports in a discovery message 132. Switch 101 can then send discovery message 132 to DMS 110. Similarly, switch 102 can also send a discovery message 134 with local deployment information or telemetry data to DMS 110. In this way, switches 101 and 102 can report the local link deployment information to DMS 110 using discovery messages 132 and 134, respectively. Upon receiving a discovery message from device 114 and a switch of network 100, DMS 110 may detect the redundant connections (e.g., connections with more than one cable) between a respective device pair, such as device pair 106 with switches 101 and 102, and device pair 107 with switch 103 and device 114.

Here, DMS 110 may detect when a plurality of ports of switch 101 of pair 106 can be coupled to a corresponding plurality of ports of switch 102 of pair 106. DMS 110 can then check the redundant connections between pair 106 against a set of criteria. The set of criteria can include consistency of VLAN configuration and compatible port types (e.g., transmission capacities). Subsequently, DMS 110 can determine a LAG 122 that can be formed with the redundant connections between pair 106. Accordingly, the ports of the redundant connections can have the same type and can be configured with the same VLANs. DMS 110 can generate LAG configuration command(s) for switch 101 that can configure LAG 122 for pair 106 at switch 101. DMS 110 can then include the command(s) in control message 136 and send control message 136 to switch 101. Similarly, DMS 110 can generate configuration command(s) for switch 102 that can configure LAG 122 for pair 106 at switch 102.

DMS 110 can then include the command(s) in control message 138 and send control message 138 to switch 102. Upon receiving control messages 136 and 138, respectively, switches 101 and 102 may execute their corresponding command(s), thereby forming LAG 122 in conjunction with each other without intervention from user 140. Similarly, DMS 110 can generate respective configuration command(s) for device 114 and switch 103 that can configure LAG 124 for pair 107. DMS 110 can then include the command(s) in respective control messages and send them to device 114 and switch 103. Upon receiving the control messages, device 114 and switch 103 may execute their corresponding command(s), thereby forming LAG 124 in conjunction with each other without intervention from user 140.

Figure 1B:
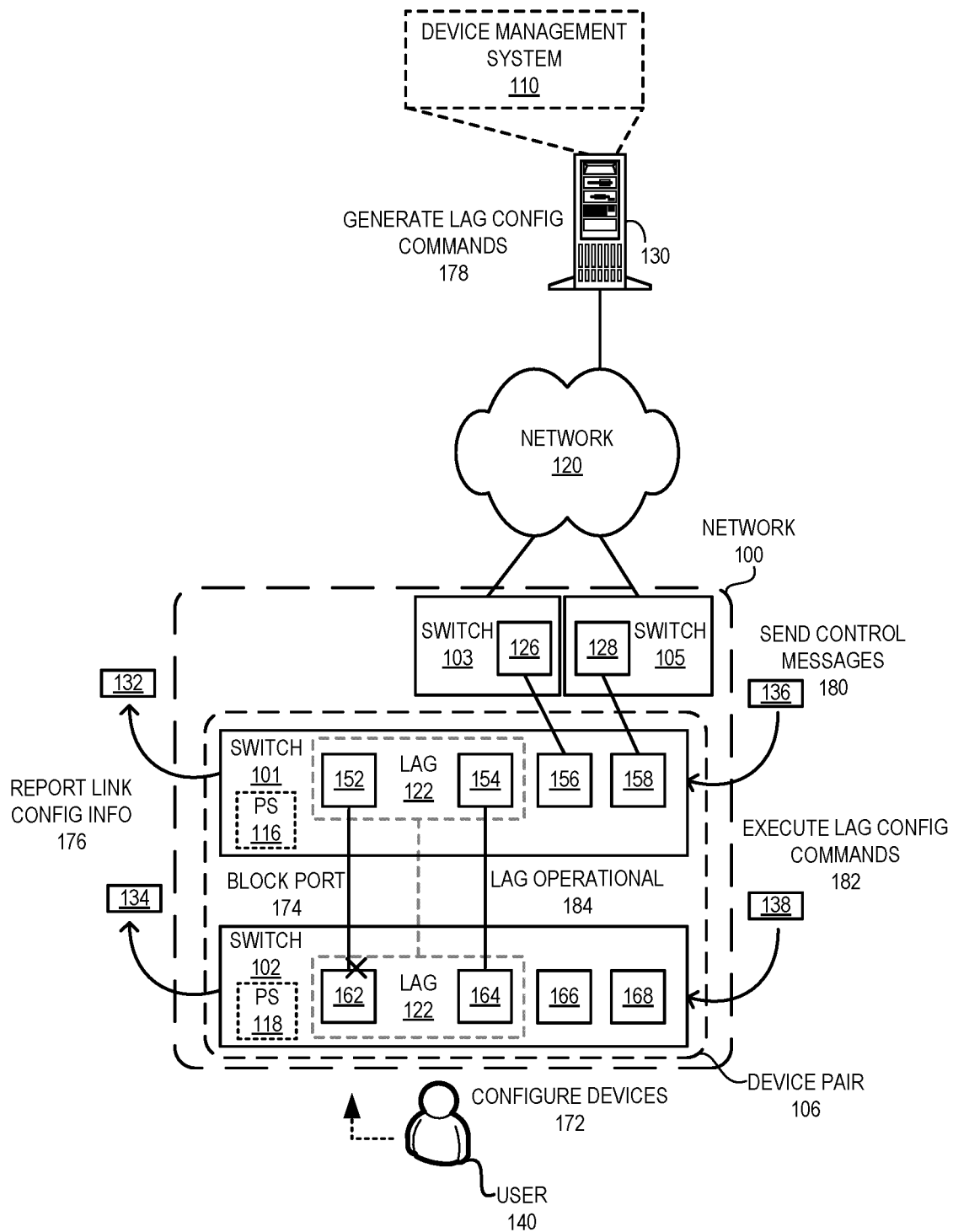
FIG. 1B illustrates an example of the process of auto-formation of LAGs using remotely-issued instructions, in accordance with an aspect of the present application.

FIG. 1B illustrates an example of the process of auto-formation of LAGs using remotely-issued instructions, in accordance with an aspect of the present application. In this example, switch 101 can include a number of ports 152, 154, 156, and 158. Similarly, switch 102 can include a number of ports 162, 164, 166, and 168. During operation, user 140 may configure the switches of network 100 (operation 172). User 140 may couple switches 101 and 102 with redundant connections where a plurality of ports of switch 101 can be coupled to a plurality of corresponding ports of switch 102. For example, user 140 may couple ports 152 and 154 of switch 101 to ports 152 and 164 of switch 102, respectively. User 140 may couple port 156 to port 126 of switch 103, and port 158 to port 128 of switch 105.

When switches 101 and 102 become operational (e.g., upon powering up), protocol stacks 116 and 118 on switches 101 and 102, respectively, can become operational. Hence, respective instances of a loop-prevention protocol, such as Spanning Tree Protocol (STP) or a variant of STP, in stacks 116 and 118 can become operational. The loop-prevention protocol instances may determine that a layer-2 loop with ports 152, 154, 162, and 164 are formed in network 100. To prevent the loop, the loop-prevention protocol instances may put port 162 in a blocking state (denoted with a cross) (operation 174). As a result, the detected loop can be removed from network 100, which allows switches 101 and 102 to start forwarding traffic. However, since port 162 can be in a blocked state, switches 101 and 102 may not utilize the bandwidth of ports 152 and 162, respectively, even if user 140 intended to actively operate both the redundant links.

In addition, respective instances of a discovery protocol, such as LLDP, in stacks 116 and 118 can also be operational. The discovery protocol instance in stack 116 can discover the deployment information associated with switch 101. Such deployment information can include configuration information indicating how ports 152, 154, 156, and 158 are coupled to ports 162, 164, 126, and 128, respectively. Switch 101 can then generate notification message 132 and include the discovery information in notification message 132. The discovery information can be included in message 132's payload, header, footer, or a combination thereof. Similarly, the discovery protocol instance in stack 118 can discover the deployment information associated with switch 102. Switch 102 can then generate notification message 134 and include the discovery information in notification message 134.

Switches 101 and 102 can then report the link configuration information to DMS 110 by sending notification messages 132 and 134, respectively (operation 176). Based on the discovery information notification messages 132 and 134, DMS 110 can determine that ports 152 and 154 of switch 101 are coupled to ports 162 and 164 of switch 102. Consequently, DMS 110 can determine the redundant connections in switch pair 106. If the redundant connections are in compliance with a set of formation criteria, DMS 110 can determine that a LAG can be formed for switch pair 106. DMS 110 can then generate respective LAG configuration commands for switches 101 and 102 (operation 178). The execution of LAG configuration commands can cause switches 101 and 102 to form the LAG. DMS 110 can include the LAG configuration commands for switches 101 and 102 in control messages 136 and 138, respectively.

DMS 110 can then send control messages 136 and 138 to switches 101 and 102, respectively (operation 180). Upon receiving control message 136, switch 101 can obtain the LAG configuration command(s) from control message 136 and execute the obtained command(s) to configure LAG 122 at switch 101. Similarly, upon receiving control message 138, switch 102 can obtain the LAG configuration command(s) from control message 138 and execute the obtained command(s) to configure LAG 122 at switch 102 (operation 182). When LAG 122 is configured at switches 101 and 102, LAG 122 can become operational (operation 184). In this way, DMS 110 can facilitate automatic configuration of LAG 122 in switch pair 106 based on remotely-issued configuration commands.

Figure 1C:
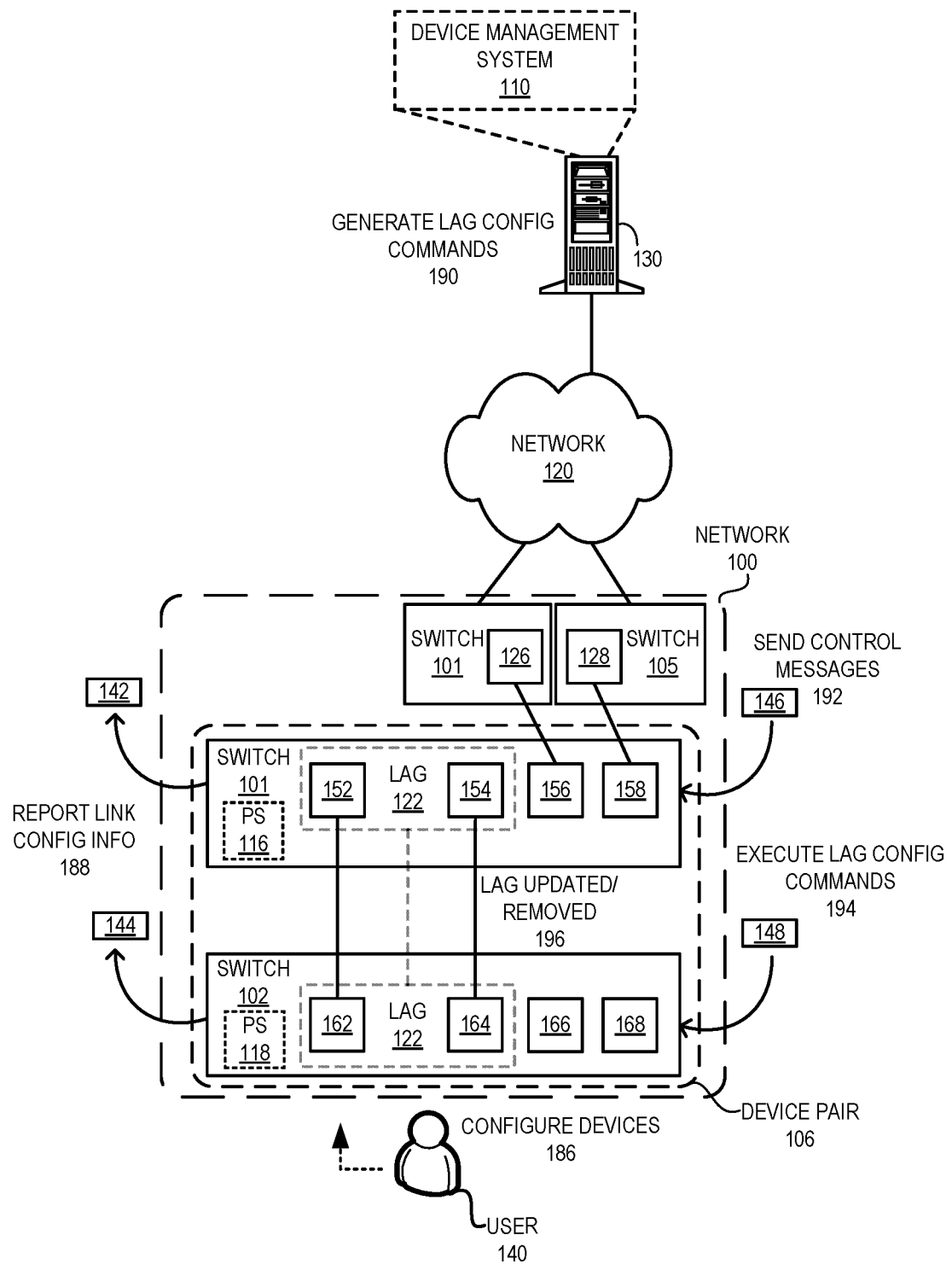
FIG. 1C illustrates an example of the process of auto-modification of LAGs using remotely-issued instructions, in accordance with an aspect of the present application.

In the same way, LAG 122 can also be automatically removed by DMS 110 based on remotely-issued configuration commands. FIG. 1C illustrates an example of the process of auto-modification of LAGs using remotely-issued instructions, in accordance with an aspect of the present application. During operation, user 140 may perform a configuration that requires modifications to LAG 122 (operation 186). For example, user 140 may remove a redundant link of LAG 122, or the criteria for forming LAG 122 is not met due to the new configuration (e.g., a new VLAN is configured at one of the ports). The modifications can include removal of the disconnected or reconfigured port(s) from LAG 122 or removing LAG 122 if there are fewer than two ports left at each of switches 101 and 102.

The discovery protocol instance in stack 116 can discover the updated deployment information associated with the new deployment or configuration associated with switch 101. The updated deployment information can indicate the removal or a new configuration for a port from LAG 122. Switch 101 can then generate notification message 142 and include the discovery information in notification message 142. Similarly, the discovery protocol instance in stack 118 can discover the new deployment or configuration associated with switch 102. Switch 102 can then generate notification message 144 and include the discovery information in notification message 144. Switches 101 and 102 can then report the link configuration information to DMS 110 by sending notification messages 142 and 144, respectively (operation 188).

Based on the discovery information notification messages 142 and 144, DMS 110 can determine that LAG 122 may require an update. DMS 110 can then generate respective LAG configuration commands for switches 101 and 102 (operation 190). The execution of LAG configuration commands can cause switches 101 and 102 to update LAG 122. The update can include a reduction of the number of ports in LAG 122 or the removal of LAG 122. DMS 110 can include the LAG configuration commands for switches 101 and 102 in control messages 146 and 148, respectively. DMS 110 can then send control messages 146 and 148 to switches 101 and 102, respectively (operation 192).

Upon receiving control message 146, switch 101 can obtain the LAG configuration command(s) from control message 146 and execute the obtained command(s) to update LAG 122 at switch 101. Similarly, upon receiving control message 148, switch 102 can obtain the LAG configuration command(s) from control message 148 and execute the obtained command(s) to update LAG 122 at switch 102 (operation 194). When LAG 122 is updated at switches 101 and 102, LAG 122 can operate with the updated ports or can be removed from network 100 (operation 196). In this way, DMS 110 can facilitate automatic updates to LAG 122 in switch pair 106 based on remotely-issued configuration commands.

Figure 2A:
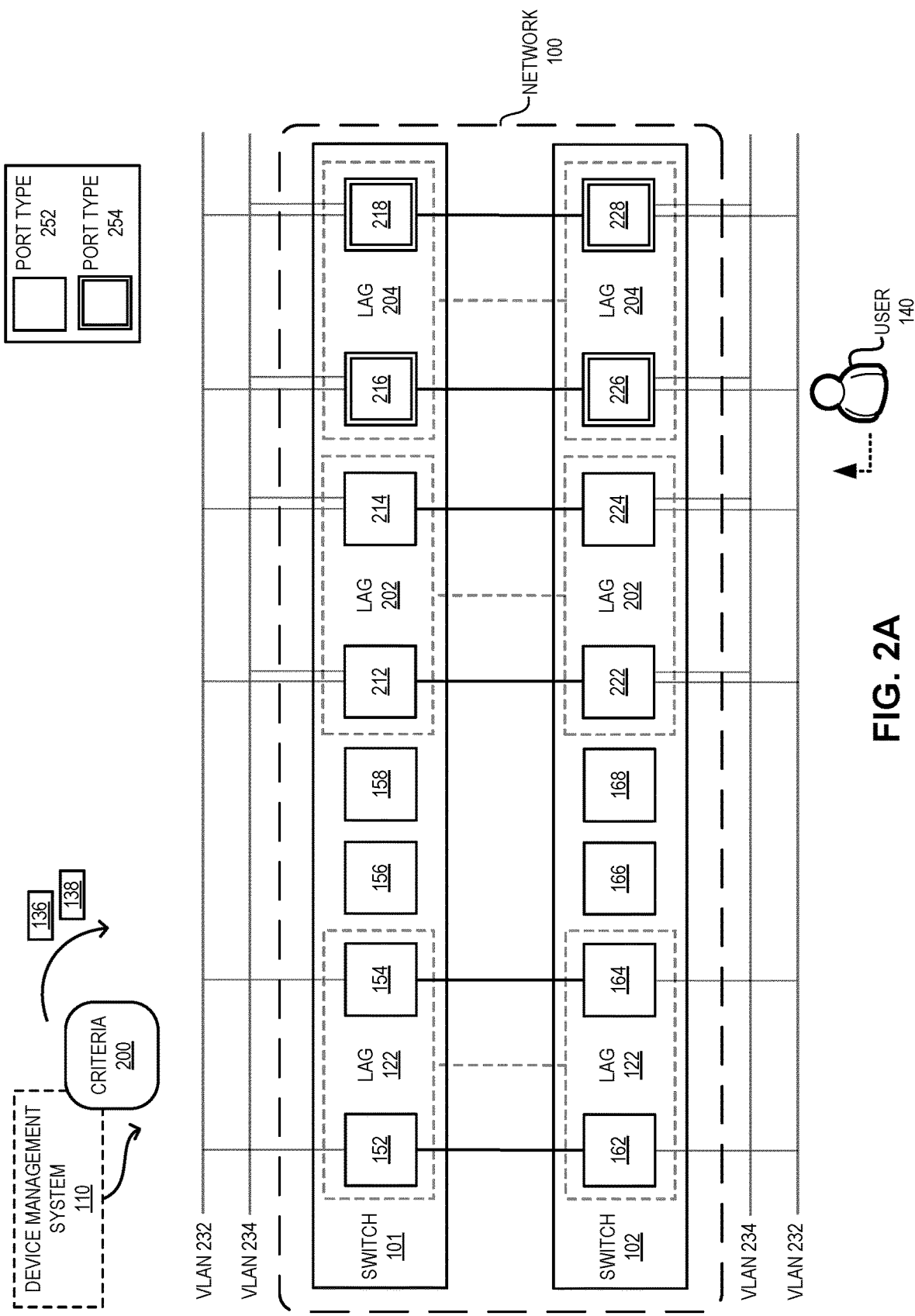
FIG. 2A illustrates an example of the auto-formation of a set LAGs based on different formation criteria, in accordance with an aspect of the present application.

FIG. 2A illustrates an example of the auto-formation of a set LAGs based on different formation criteria, in accordance with an aspect of the present application. In this example, in addition to ports 152, 154, 156, and 158, switch 101 can also include ports 212, 214, 216, and 218. Furthermore, in addition to ports 162, 164, 166, and 168, switch 102 can also include ports 222, 224, 226, and 228. Ports 212, 214, 216, and 218 can be coupled to ports 222, 224, 226, and 228, respectively. Ports 216 and 218 of switch 101, and ports 226 and 228 of switch 102 can be of port type 254. The rest of the ports of switches 101 and 102 can be of port type 252. A port type may indicate one or more of: a transmission capacity (e.g., 1 or 10 Gigabit per second (Gbps)), transmission protocol (e.g., Ethernet, wireless LAN, Asynchronous Transfer Mode (ATM), Multiprotocol Label Switching (MPLS), and token ring), transmission technology (e.g., optical, wireless, and coaxial), and connector type (e.g., modular, latch, or screw connector).

User 140 may configure a VLAN 232 at ports 152 and 154 of switch 101, and ports 162 and 164 of switch 102. On the other hand, user 140 may configure VLANs 232 and 234 at ports 212, 214, 216, and 218 of switch 101, and ports 222, 224, 226, and 228 of switch 102. Upon obtaining configuration information, DMS 110 can identify the redundant connections between switches 101 and 102. DMS 110 can then compare a respective of the redundant connections with a set of formation (or grouping) criteria 200. Criteria 200 can include one or more rules. A respective rule can indicate the enforcement of consistency for a feature among the connections of a LAG. For example, respective rules in criteria 200 can indicate that the ports participating in a LAG should belong to the same device pair, should have a threshold number of ports, should be configured with the same set of VLANs, and should belong to the same port type. Subsequently, DMS 110 can determine LAG 122 that can be formed with a subset of the redundant connections. Here, the ports of the subset of the redundant connections can be configured with VLAN 232 and belong to port type 252.

In the same way, based on the rules in criteria 200, DMS 110 can determine a LAG 202 that can be formed with the ports that are configured with VLANs 232 and 234, and belong to port type 252. DMS 110 further can determine a LAG 204 that can be formed with the ports that are configured with VLANs 232 and 234, and belong to port type 254. In this way, the rules in criteria 200 can ensure that a respective LAG can operate as a virtual connection between switches 101 and 102 without raising a conflict for VLAN configuration and port type. For example, any link of LAG 122 can forward traffic of VLAN 232 and drop traffic of VLAN 234. Furthermore, any link from the links of LAG 122 can be selected for forwarding traffic since the port types are also consistent.

DMS 110 can then generate configuration commands that can configure ports 152 and 154 for LAG 122, ports 212 and 214 for LAG 202, and ports 216 and 218 for LAG 204 at switch 101. Similarly, DMS 110 can then generate configuration commands that can configure ports 162 and 164 for LAG 122, ports 222 and 224 for LAG 202, and ports 226 and 228 for LAG 204 at switch 102. DMS 110 can then include the respective configuration commands in control messages 136 and 138, and send them to switches 101 and 102, respectively. In this way, LAGs 122, 202, and 204 can be automatically formed between switches 101 and 102 without requiring manual configuration from user 140.

Figure 2B:
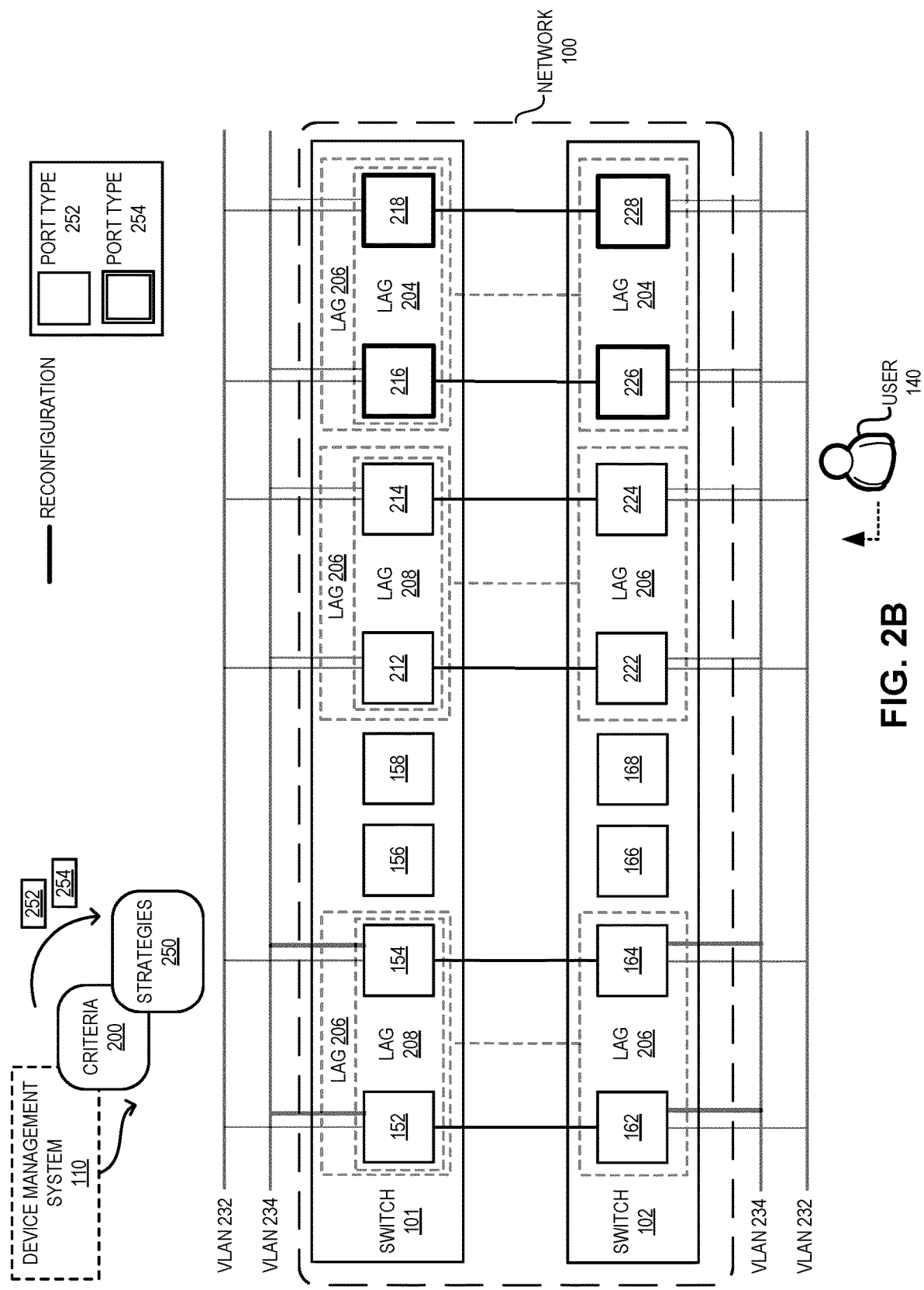
FIG. 2B illustrates an example of the auto-formation of a LAG based on reconfiguration, in accordance with an aspect of the present application.

Here, DMS 110 may form LAGs based on the rules in criteria 200 that can enforce consistency of configuration among the ports of a respective LAG. As a result, DMS 110 may determine a plurality of LAGs 122, 202, and 204 between switches 101 and 102. In addition to or instead of the enforcement of consistency, criteria 200 can also include reconfiguration of ports. FIG. 2B illustrates an example of the auto-formation of a LAG based on reconfiguration, in accordance with an aspect of the present application. DMS 110 may apply criteria 200 in conjunction with a set of strategies 250. DMS 110 can determine whether to apply the reconfiguration based on strategies 250. DMS 110 may select LAG candidates from the redundant connections based on strategies 250.

For example, strategies 250 can indicate whether to generate (i) all possible LAGs, (ii) a LAG that groups all possible redundant connections, and (iii) a LAG with the highest possible transmission capacity based on the number of ports and their respective transmission capacities. Strategies 250 may also indicate the conditions when no LAGs are created. For a respective rule of criteria 200 that facilitates the enforcement of consistency, DMS 110 may determine a reconfiguration indicator based on strategies 250. If the indicator is set, DMS 110 may determine whether reconfiguration is possible for the feature associated with the rule to incorporate a larger set of redundant connections into a LAG.

For example, if DMS 110 determines the reconfiguration indicator for the rule associated with the consistency of VLANs, DMS 110 may first generate reconfiguration commands for ports 152, 154, 162, and 164 to configure VLAN 234. DMS 110 may send control messages 252 and 254 to switches 101 and 102, respectively, with these reconfiguration commands. When switches 101 and 102 execute their respective reconfiguration commands, the port pair of a respective redundant link between switches 101 and 102 can be configured with both VLANs 232 and 234. This allows DMS 110 to configure a LAG 208 with ports 152, 154, 212, and 214 of switch 101, and ports 162, 164, 222, and 224 of switch 102. Under such circumstances, ports 216, 218, 226, and 228 may remain of port type 254 (not shown in FIG. 2B). Hence, DMS 110 may form LAG 204 with these ports.

Furthermore, if the reconfiguration indicator is set for the rule associated with the consistency of port types, DMS 110 may also generate another set of reconfiguration commands for ports 216, 218, 226, and 228 to ensure consistency of port types. For example, if these ports support a transmission rate of 10 Gbps while the other ports support a transmission rate of 1 Gbps, the configuration commands may reconfigure ports 216, 218, 226, and 228 to operate at a transmission rate of 1 Gbps. Control messages 252 and 254 can then also include the other set of reconfiguration commands.

When switches 101 and 102 execute their respective reconfiguration commands, the port pair of a respective redundant link between switches 101 and 102 can be configured to operate at a transmission rate of 1 Gbps. This allows DMS 110 to configure a LAG 206 with ports 152, 154, 212, 214, 216, and 218 of switch 101, and ports 162, 164, 222, 224, 226, and 228 of switch 102. In this way, reconfiguration may allow DMS 110 to configure a number of LAGs or a unified LAG between switches 101 and 102 in accordance with strategies 250.

It should be noted that strategies 250 may also indicate how to manage manually created LAGs. In particular, DMS 110 may not preclude user 140 from manually creating and managing LAGs. Strategies 250 can indicate then indicate that DMS 110 should not change the manually-created LAGs and the ports that they group. Such a strategy can supersede the other strategies. As a result, even if DMS 110 determines that a unified LAG is indicated by another strategy, DMS 110 may not interrupt the manually-created LAGs. Furthermore, due to the finite resources on switches 101 and 102, DMS 110 may be limited to generating a limited number of LAGs between switches 101 and 102. Hence, strategies 250 may include a resource sharing strategy for manually and automatically created LAGs. The strategy can indicate that a set of LAGs, which can be limited to a threshold number, should be reserved for auto-generation.

Figure 3:
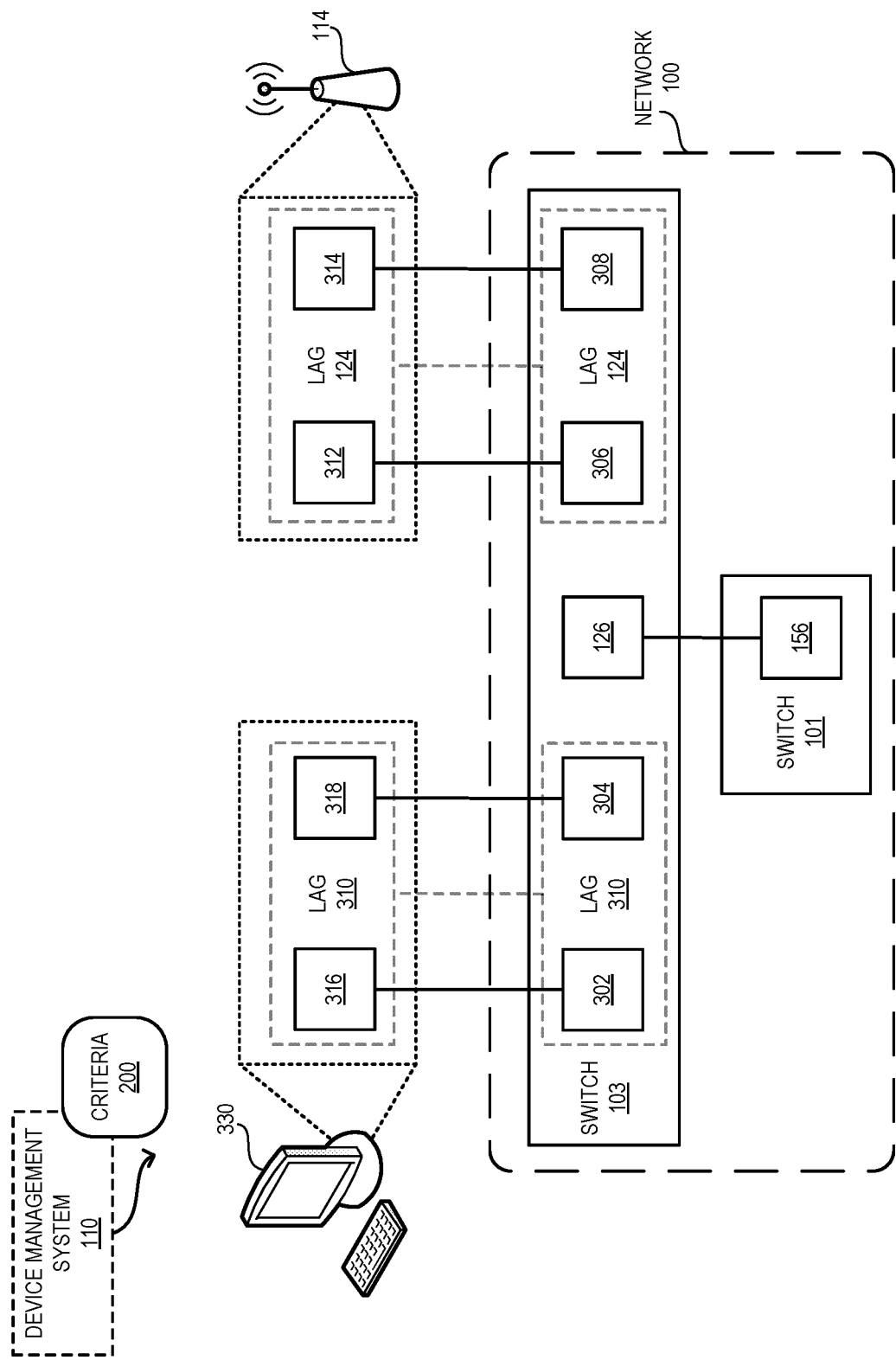
FIG. 3 illustrates an example of the auto-formation of a set LAGs with different types of devices, in accordance with an aspect of the present application.

In addition to switches 101 and 102, DMS 110 may facilitate automatic LAG formation with different types of devices, such as access points (APs) and Internet gateways. FIG. 3 illustrates an example of the auto-formation of a set of LAGs with different types of devices, in accordance with an aspect of the present application. In this example, in addition to port 126, switch 103 can also include ports 302, 304, 306, and 308. Ports 306 and 308 can be coupled to ports 312 and 314 of device 114. Here, device 114 can be an AP. Since DMS 110 can manage device 114 and switch 103, DMS 110 can obtain the deployment information from switch 103 and device 114. Based on the deployment information, DMS 110 can generate LAG configuration commands for the ports of the redundant links. Subsequently, DMS 110 can send the commands to switch 103 and device 114 via respective control messages.

When switch 103 and device 114 execute their respective configuration commands, LAG 124 is formed between switch 103 and device 114. Hence, DMS 110 can automatically form a LAG between heterogeneous device types. In particular, DMS 110 may facilitate the automatic formation of LAGs between any devices that is under the management domain of DMS 110. For example, ports 302 and 304 can be coupled to ports 316 and 318 of device 330, which can be another device managed by DMS 110. Hence, device 330 can also report local deployment information to DMS 110. Accordingly, DMS 110 can push respective configuration commands for a LAG 310 to switch 103 and device 330. When switch 103 and device 330 execute their respective configuration commands, LAG 310 is formed between them. In this way, switch 103 may form LAGs with different devices, and DMS 110 can facilitate auto-formation of LAGs for heterogeneous devices.

Figure 4:
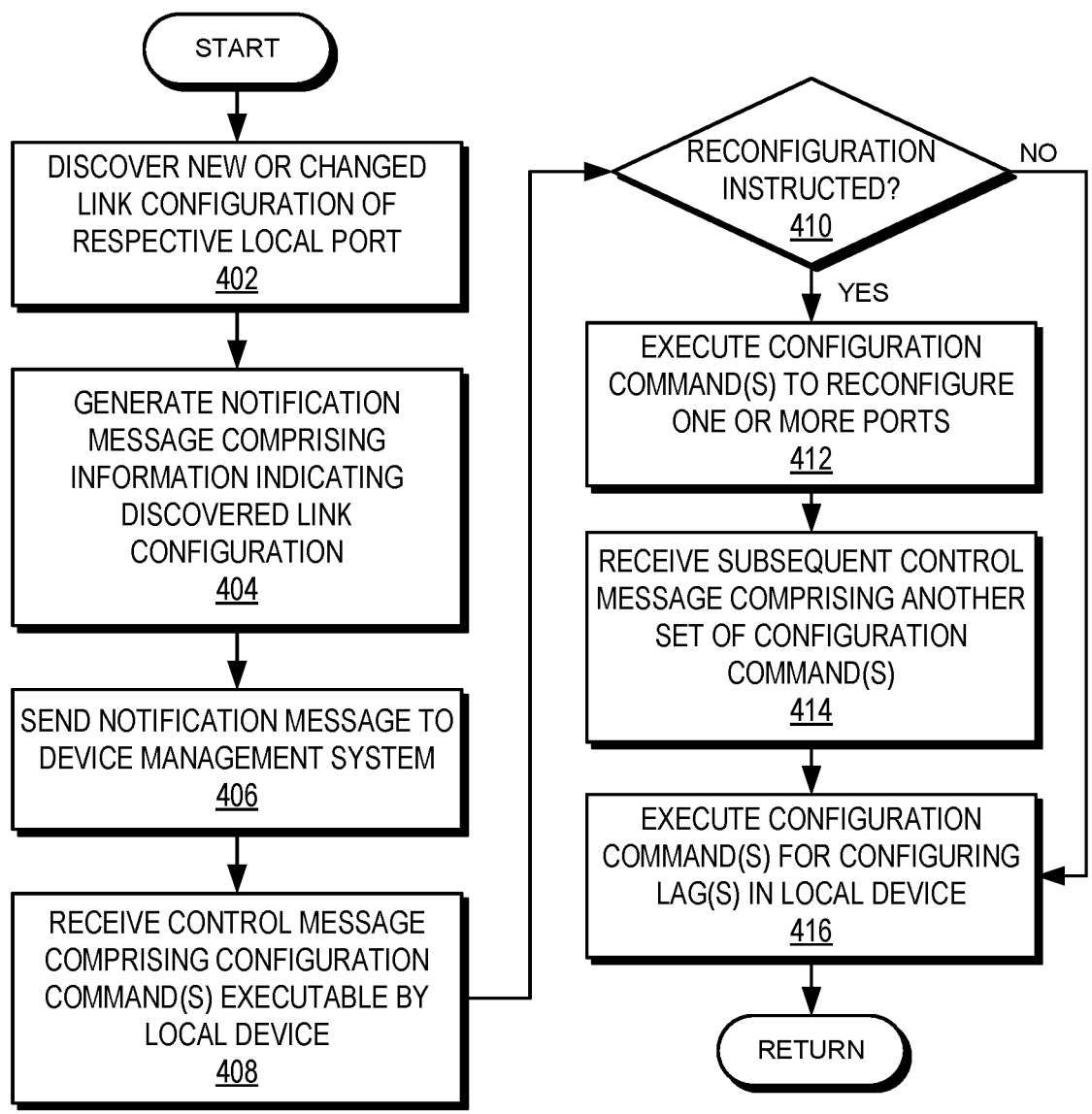
FIG. 4 presents a flowchart illustrating the process of a device automatically forming one or more LAGs based on remotely-issued instructions, in accordance with an aspect of the present application.

FIG. 4 presents a flowchart illustrating the process of a device automatically forming one or more LAGs based on remotely-issued instructions, in accordance with an aspect of the present application. During operation, the device can discover new or changed link configuration of a respective local port (i.e., how the device is deployed) (operation 402). The device can then generate a notification message comprising information indicating the discovered link configuration (i.e., the deployment information) (operation 404). Subsequently, the device can send the notification message to the DMS (operation 406). The device can receive a control message comprising configuration command(s) executable by the local device from the DMS (operation 408) and determine whether reconfiguration is instructed (operation 410).

If reconfiguration is instructed, the device can execute the configuration command(s) to reconfigure one or more ports (operation 412). The device can then receive a subsequent control message comprising another set of configuration command(s) (operation 414). This set of configuration command(s) can include instructions for forming a LAG. It should be noted that both sets of configuration command(s) can be included in the same control message. On the other hand, if reconfiguration is not instructed, the configuration command(s) of operation 408 can include instructions for forming a LAG. Hence, if reconfiguration is not instructed (operation 410) or upon receiving the subsequent control message (operation 414), the device can execute the configuration command(s) for reconfiguring LAG(s) in the local device (operation 418).

Figure 5A:
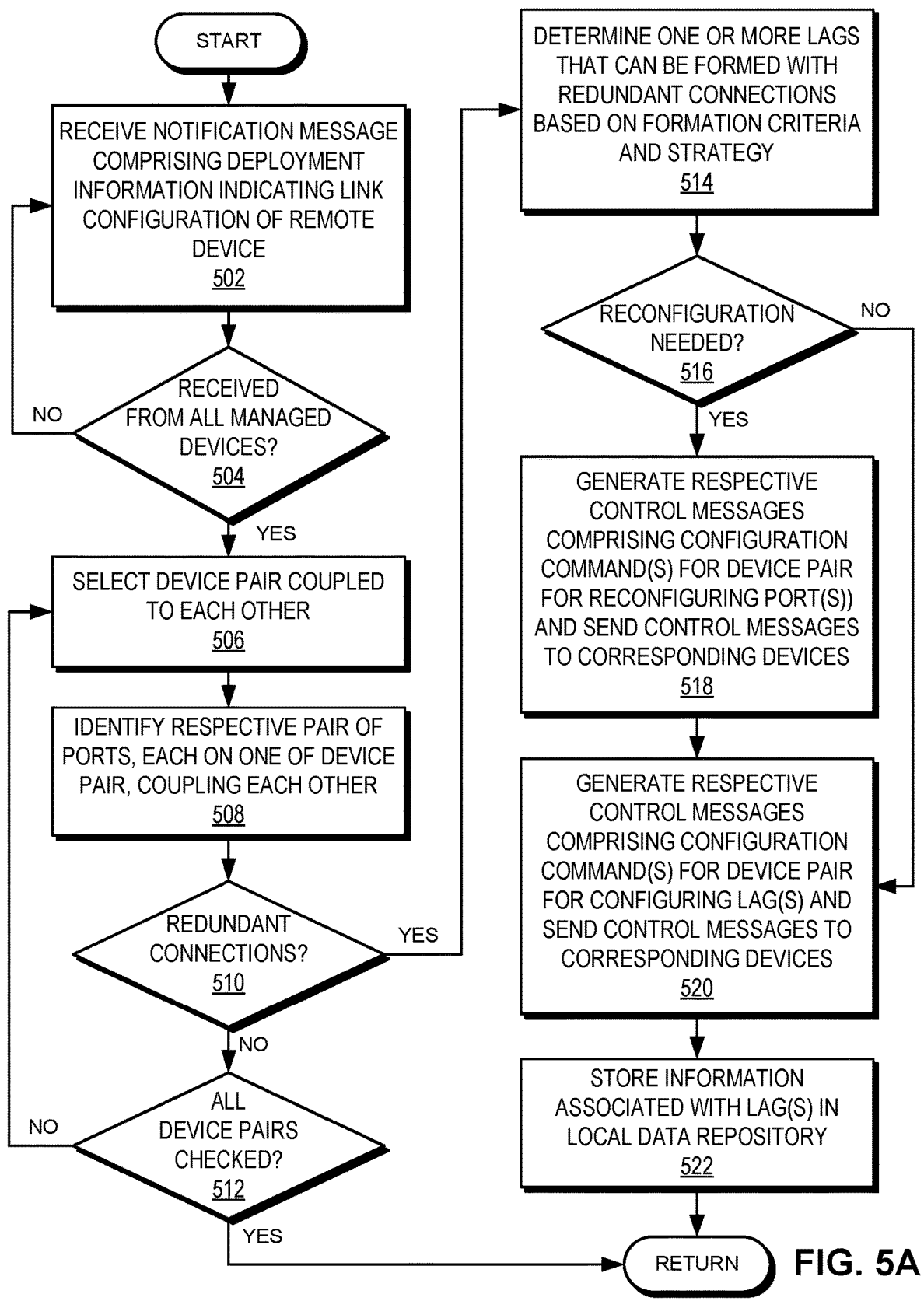
FIG. 5A presents a flowchart illustrating the process of a DMS automatically forming one or more LAGs between remotely managed devices based on the corresponding deployment information, in accordance with an aspect of the present application.

FIG. 5A presents a flowchart illustrating the process of a DMS automatically forming one or more LAGs between remotely managed devices based on the corresponding deployment information, in accordance with an aspect of the present application. During operation, the DMS can receive a notification message comprising deployment information indicating the link configuration of a remote device (operation 502). If the DMS hasn't received notifications from all managed devices (operation 504), the DMS can continue to receive another notification message (operation 502). If the DMS has received from all managed devices, the DMS can select a device pair coupled to each other (operation 506) and identify a respective pair of ports, each on one of the device pair, coupling each other (operation 508).

The DMS can then determine whether redundant connections are coupling the device pair (operation 510). If redundant connections are not coupling the device pair, the DMS can determine whether all device pairs are checked (operation 512). If all device pairs are checked without finding a set of redundant connections, the process may terminate. On the other hand, if all device pairs are not checked, the DMS can continue to select another device pair coupled to each other (operation 506). On the other hand, if redundant connections are coupling the device pair, the DMS can determine one or more LAGs that can be formed with the redundant connections based on the formation criteria and strategy (operation 514). The DMS can then determine whether reconfiguration is needed for forming the one or more LAGs (operation 516).

If reconfiguration is needed, the DMS can generate respective control messages comprising configuration command(s) for the device pair for reconfiguring port(s) and send the control messages to corresponding devices (operation 518). If reconfiguration is not needed (operation 516) or upon sending the control messages (operation 518), the DMS can generate respective control messages comprising configuration command(s) for the device pair for configuring the LAG(s) and send the control messages to corresponding devices (operation 520). The DMS may include both sets of configuration command(s) in the same control message. Subsequently, the DMS may store the information associated with the LAG(s) in a local data repository (e.g., a relational database) (operation 522).

Figure 5B:
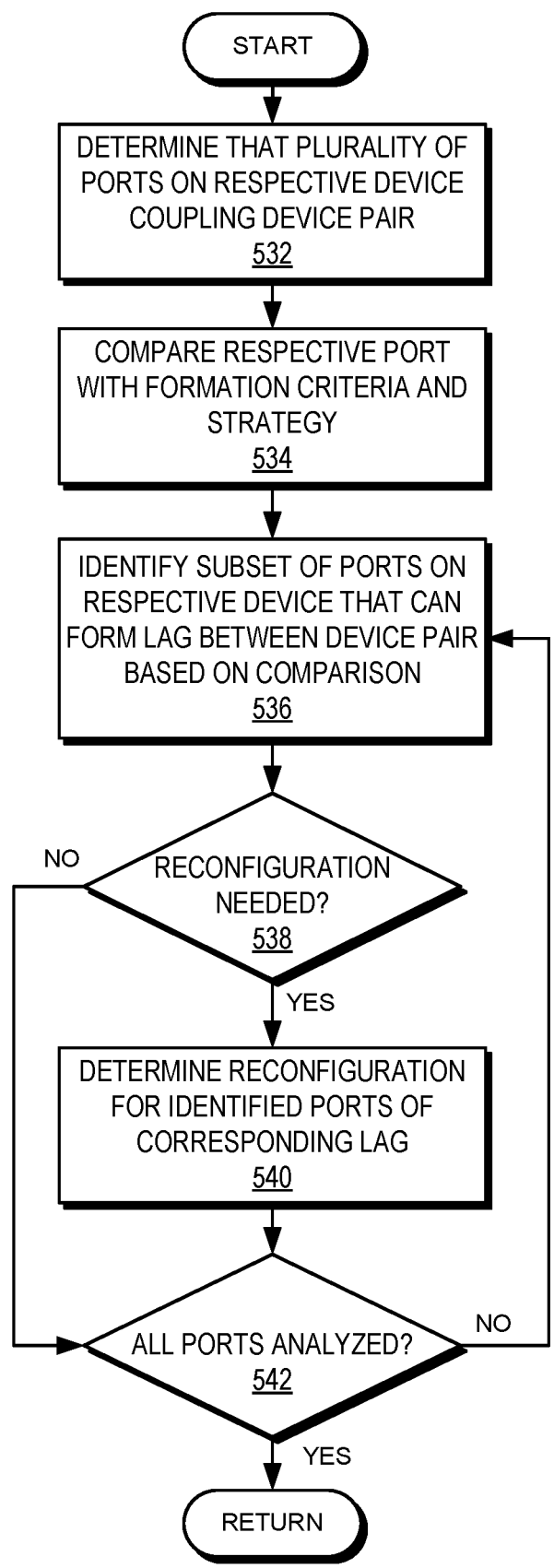
FIG. 5B presents a flowchart illustrating the process of a DMS determining a respective LAG that can be formed between remotely managed devices based on the corresponding deployment information, in accordance with an aspect of the present application.

FIG. 5B presents a flowchart illustrating the process of a DMS determining a respective LAG that can be formed between remotely managed devices based on the corresponding deployment information, in accordance with an aspect of the present application. During operation, the DMS can determine that the plurality of ports on each device coupling a device pair (operation 532) and compare a respective port with the formation criteria (operation 534). The DMS can identify a subset of ports on a respective device that can form a LAG between devices of the pair based on the comparison (operation 536).

The DMS can then determine whether reconfiguration is needed (operation 538). If reconfiguration is needed, the DMS can determine the reconfiguration (e.g., a new VLAN or adjusted transmission capacity) for the identified ports of corresponding LAG (operation 540). If reconfiguration is not needed (operation 538) or upon determining the reconfiguration (operation 540), the DMS can determine whether all ports of the subset of ports are analyzed (operation 542). If all ports of the subset of ports are analyzed, the DMS can identify another subset of ports on a respective device that form another LAG between devices in the pair based on the comparison (operation 536).

Figure 5C:
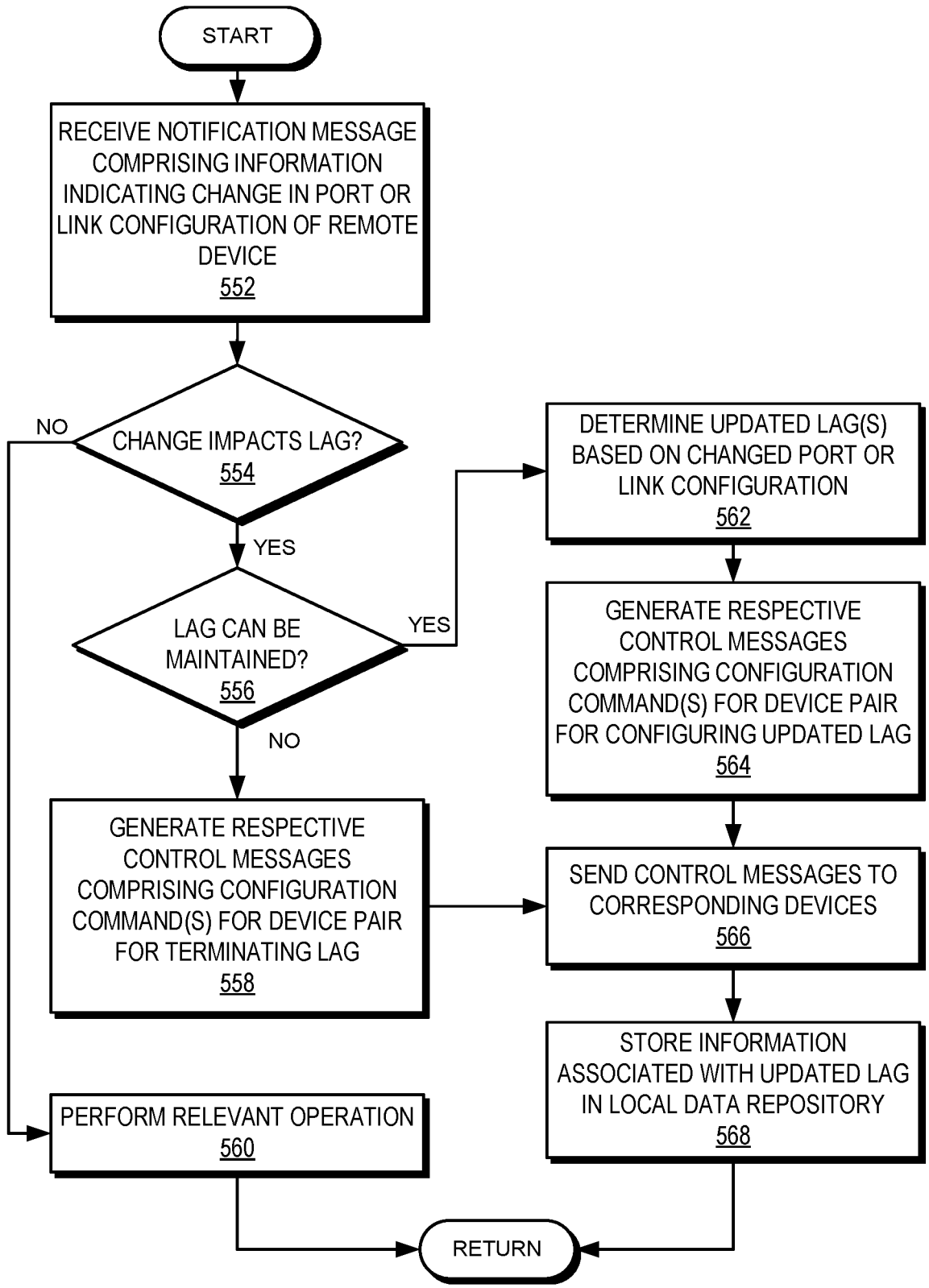
FIG. 5C presents a flowchart illustrating the process of a DMS automatically updating a LAG between remotely managed devices based on the corresponding deployment information, in accordance with an aspect of the present application.

FIG. 5C presents a flowchart illustrating the process of a DMS automatically updating a LAG between remotely managed devices based on the corresponding deployment information, in accordance with an aspect of the present application. During operation, the DMS can receive a notification message comprising information indicating a change in the port or link configuration of a remote device (operation 552). The DMS can then determine whether the change impacts a LAG (operation 554). If the change does not impact a LAG, the DMS can perform a relevant operation (operation 560). On the other hand, if the change impacts a LAG, the DMS can determine whether the LAG can be maintained (operation 556).

If the LAG cannot be maintained, the DMS can generate respective control messages comprising configuration command(s) for the device pair for terminating LAG (operation 558). On the other hand, if the LAG can be maintained, the DMS can determine updated LAG(s) based on the changed port or link configuration (operation 562). The DMS can then generate respective control messages comprising configuration command(s) for the device pair for configuring the updated LAG (operation 564). Upon generating the control messages (operation 558 or 564), the DMS can send the control message to corresponding devices (operation 566) and store information associated with the updated LAG in a local data repository (operation 568).

Figure 6:
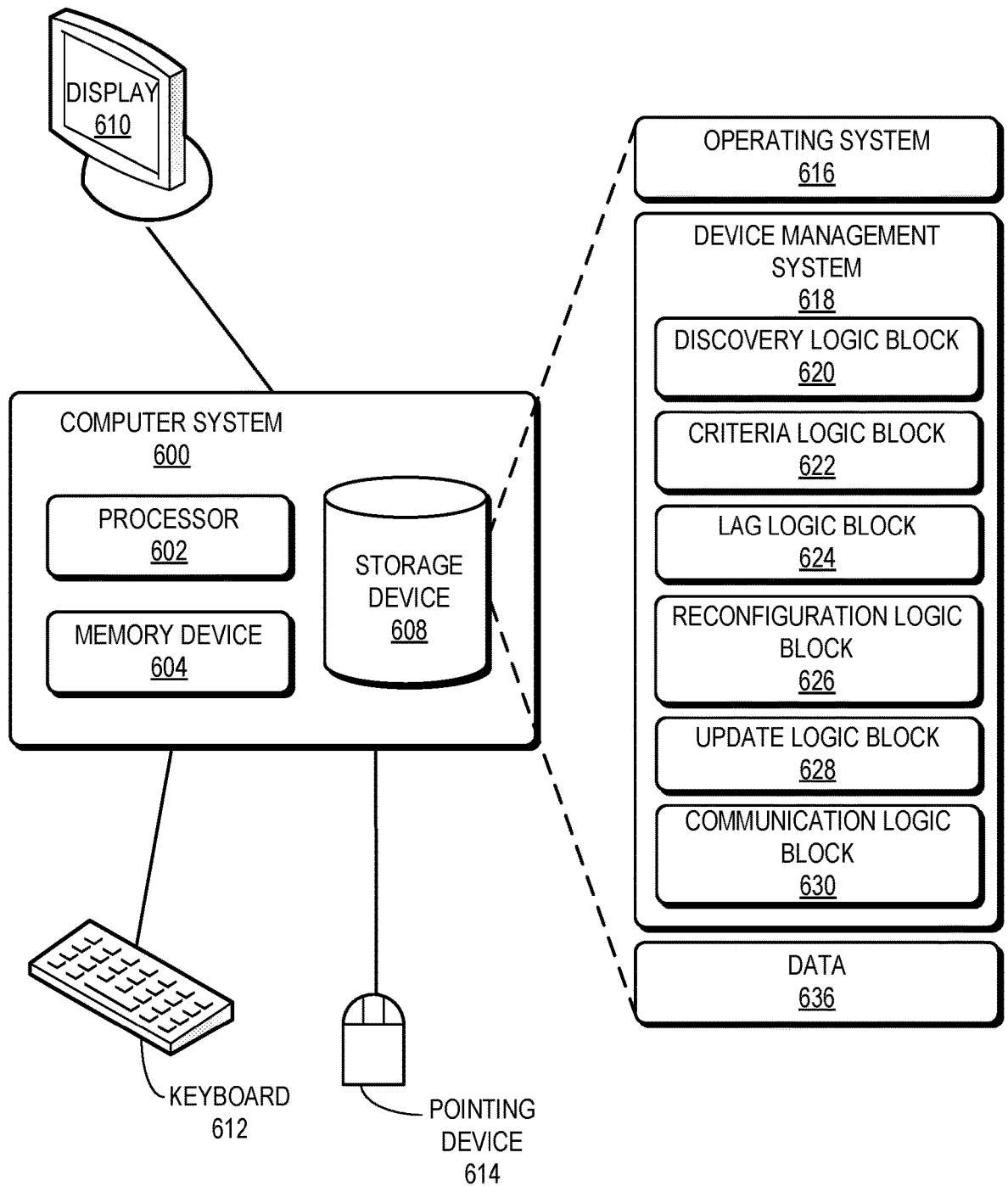
FIG. 6 illustrates an example of a computer system supporting a DMS that can automatically form LAGs based on remotely-issued instructions, in accordance with an embodiment of the present application.

FIG. 6 illustrates an example of a computer system supporting a DMS that can automatically form LAGs based on remotely-issued instructions, in accordance with an embodiment of the present application. Computer system 600 includes a processor 602, a memory device 604, and a storage device 608. Memory device 604 can include volatile memory (e.g., a dual in-line memory module (DIMM)). Furthermore, computer system 600 can be coupled to a display device 610, a keyboard 612, and a pointing device 614. Storage device 608 can store an operating system 616, a DMS 618, and data 636. DMS 618 can facilitate the operations of DMS 110 of FIG. 1A.

DMS 618 can include instructions, which when executed by computer system 600, can cause computer system 600 to perform methods and/or processes described in this disclosure. DMS 618 may also include pieces of hardware for executing as a hardware accelerator. DMS 618 can include instructions for obtaining deployment information from a respective managed device (discovery logic block 620). Furthermore, DMS 618 can include instructions for selecting a set of redundant links that can be grouped together as a LAG based on a set of formation criteria and strategies (criteria logic block 622).

DMS 618 can also include instructions for generating a control message comprising configuration command(s) executable by a managed device for configuring a LAG (LAG logic block 624). DMS 618 can include instructions for generating a control message comprising configuration command(s) executable by a managed device for reconfiguring one or more ports for forming a LAG (reconfiguration logic block 626). DMS 618 can also include instructions for generating a control message comprising configuration command(s) executable by a managed device for updating (or removing) a LAG (update logic block 628). DMS 618 can also include instructions for sending and receiving messages, such as notification and control messages (communication logic block 630).

Data 636 can include any data that is required as input, or that is generated as output by the methods and/or processes described here. Specifically, data 636 can include information associated with deployment information, such as link configuration, associated with a respective port of a respective managed device, LAG configuration, a set of formation criteria, and a set of strategies for forming a LAG.

Figure 7:
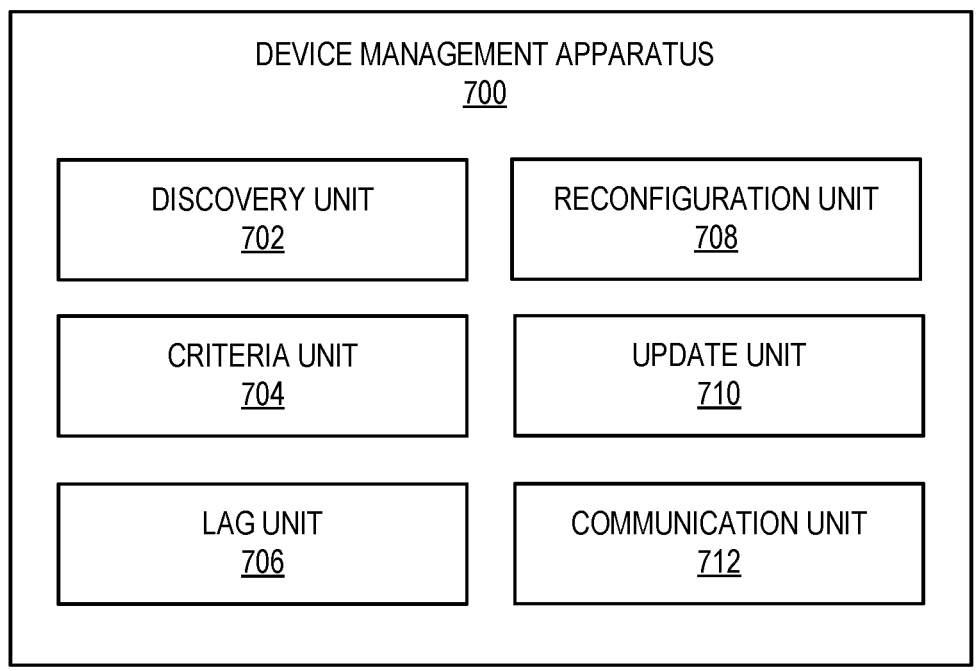
FIG. 7 illustrates an exemplary apparatus that facilitates a DMS that can automatically form LAGs based on remotely-issued instructions, in accordance with an embodiment of the present application.

FIG. 7 illustrates an exemplary apparatus that facilitates a DMS that can automatically form LAGs based on remotely-issued instructions, in accordance with an embodiment of the present application. Device management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Apparatus 700 may also be a hardware accelerator.

Specifically, apparatus 700 can comprise units 702-712, which perform functions or operations similar to logic blocks 620-630 of computer system 600 of FIG. 6, including: a discovery unit 702; a criteria unit 704; a LAG unit 706; a reconfiguration unit 708; an update unit 710; and a communication unit 712.

The data structures and code described in this detailed description are typically stored on a computer-readable storage medium, which may be any device or medium that can store code and/or data for use by a computer system. The computer-readable storage medium includes, but is not limited to, flip/flops, latches, registers, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   obtaining, at a computing system, information associated with connectivity between a first device and a second device, wherein the computing system remotely provides network configurations to the first and second devices via a network;
   in response to determining that the connectivity includes a plurality of links, identifying a subset of links of the plurality of links that can be configured as a Link Aggregation Group (LAG) between the first and second devices based on a set of grouping criteria for selecting a respective link for the LAG, wherein the LAG operates as an aggregated link with redundancy;
   generating respective configuration commands executable at the first and second devices for generating the LAG based on the information associated with connectivity;
   sending the respective configuration commands to the first and second devices, wherein the respective configuration commands facilitate formation of the LAG at the first and second devices; and
   determining whether to reconfigure one or more ports forming the subset of links based on a set of strategies, wherein the reconfiguration facilitates configuration consistency among ports of the subset of links.

2. The method of claim 1, wherein obtaining the information associated with the connectivity between the first and second devices further comprises receiving respective notification messages comprising local link configuration information from the first and second devices.

3. The method of claim 2, wherein the local link configuration information comprises telemetry data discovered using Link Layer Discovery Protocol (LLDP) at the first and second devices.

4. The method of claim 1, wherein the set of grouping criteria indicates one or more of: ports participating in the LAG belong to the first and second devices, a threshold number of ports are present in the LAG, a same set of virtual local area networks (VLANs) are configured at a respective port of the LAG, and a respective port of the LAG belong to a same port type.

5. The method of claim 1, wherein the set of strategies indicates whether to generate one or more of: no LAG, all possible LAGs, a LAG that groups all possible redundant connections, and a LAG with a highest possible transmission capacity.

6. The method of claim 1, further comprising identifying a second subset of links of the plurality of links that can be configured as a second LAG between the first and second devices based on the set of grouping criteria.

7. The method of claim 1, further comprising:
obtaining updated information indicating a modification to one or more ports or links of the LAG; and
determining whether the LAG can be maintained.

8. The method of claim 7, further comprising:
in response to determining that the LAG can be maintained, generating respective configuration commands executable at the first and second devices for updating the LAG in accordance with the updated information; and
in response to determining that the LAG cannot be maintained, generating respective configuration commands executable at the first and second devices for removing the LAG.

9. A non-transitory computer-readable storage medium storing instructions that when executed by a computing system cause the computing system to perform a method, the method comprising:
obtaining, at the computing system, information associated with connectivity between a first device and a second device, wherein the computing system remotely provides network configurations to the first and second devices via a network;
in response to determining that the connectivity includes a plurality of links, identifying a subset of links of the plurality of links that can be configured as a Link Aggregation Group (LAG) between the first and second devices based on a set of grouping criteria for selecting a respective link for the LAG, wherein the LAG operates as an aggregated link with redundancy;
generating respective configuration commands executable at the first and second devices for generating the LAG based on the information associated with connectivity;
sending the respective configuration commands to the first and second devices, wherein the respective configuration commands facilitate formation of the LAG at the first and second devices; and
determining whether to reconfigure one or more ports forming the subset of links based on a set of strategies, wherein the reconfiguration facilitates configuration consistency among ports of the subset of links.

10. The non-transitory computer-readable storage medium of claim 9, wherein obtaining the information associated with the connectivity between the first and second devices further comprises receiving respective notification messages comprising local link configuration information from the first and second devices.

11. The non-transitory computer-readable storage medium of claim 10, wherein the local link configuration information comprises telemetry data discovered using Link Layer Discovery Protocol (LLDP) at the first and second devices.

12. The non-transitory computer-readable storage medium of claim 9, wherein the set of grouping criteria indicates one or more of: ports participating in the LAG belong to the first and second devices, a threshold number of ports are present in the LAG, a same set of virtual local area networks (VLANs) are configured at a respective port of the LAG, and a respective port of the LAG belong to a same port type.

13. The non-transitory computer-readable storage medium of claim 9, wherein the set of strategies indicates whether to generate one or more of: no LAG, all possible LAGs, a LAG that groups all possible redundant connections, and a LAG with a highest possible transmission capacity.

14. The non-transitory computer-readable storage medium of claim 9, wherein the method further comprises identifying a second subset of links of the plurality of links that can be configured as a second LAG between the first and second devices based on the set of grouping criteria.

15. The non-transitory computer-readable storage medium of claim 9, wherein the method further comprises:
obtaining updated information indicating a modification to one or more ports or links of the LAG; and
determining whether the LAG can be maintained.

16. The non-transitory computer-readable storage medium of claim 15, wherein the method further comprises:
in response to determining that the LAG can be maintained, generating respective configuration commands executable at the first and second devices for updating the LAG in accordance with the updated information; and
in response to determining that the LAG cannot be maintained, generating respective configuration commands executable at the first and second devices for removing the LAG.

17. A computer system, comprising:
processing circuitry;
a computer-readable storage medium comprising instructions executable by the processing circuitry to:
obtain, at the computer system, information associated with connectivity between a first device and a second device, wherein the computer system remotely provides network configurations to the first and second devices via a network;
in response to determining that the connectivity includes a plurality of links, identify a subset of links of the plurality of links that can be configured as a Link Aggregation Group (LAG) between the first and second devices based on a set of grouping criteria for selecting a respective link for the LAG, wherein the LAG operates as an aggregated link with redundancy; and
generate respective configuration commands executable at the first and second devices for generating the LAG based on the information associated with connectivity;

send the respective configuration commands to the first and second devices, wherein the respective configuration commands facilitate formation of the LAG at the first and second devices;

obtain updated information indicating a modification to one or more ports or links of the LAG;

determine whether the LAG can be maintained; and generate respective configuration commands executable at the first and second devices for updating or removing the LAG in accordance with the updated information.

* * * * *